Sept. 28, 1954 L. P. CROSS 2,689,972
SAUSAGE LINKING MACHINE
Filed Nov. 12, 1949 7 Sheets-Sheet 1
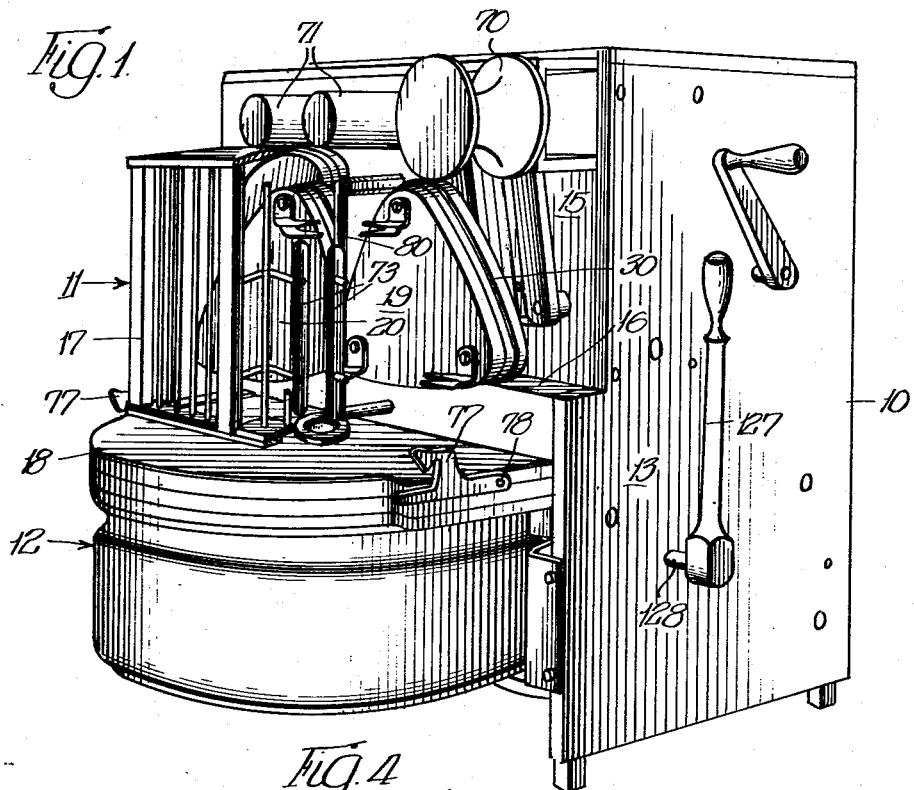
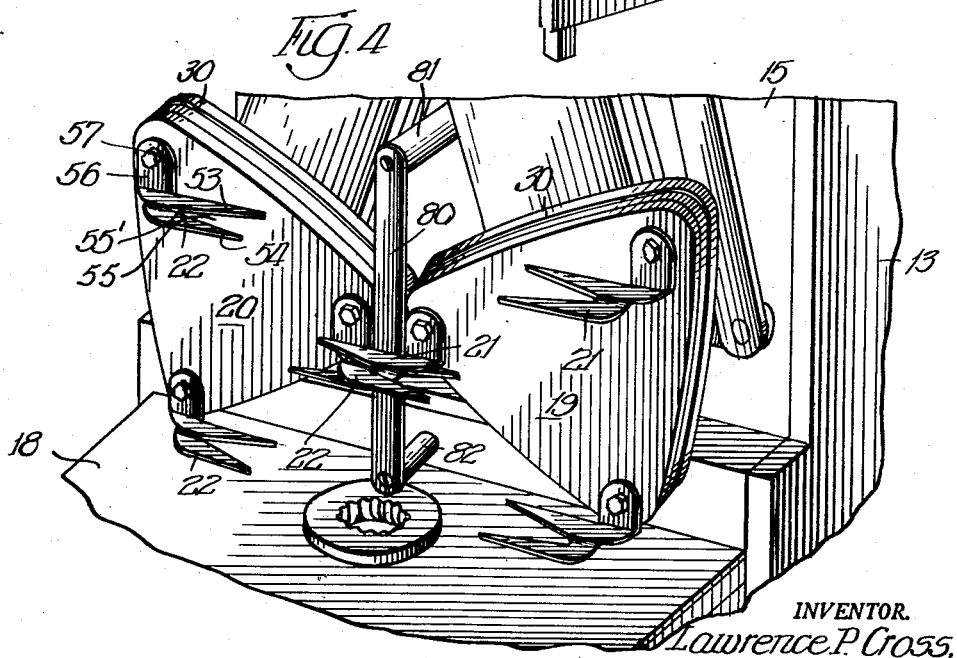
INVENTOR.
Lawrence P. Cross,
BY
Cromwell, Greist + Warden
Attys

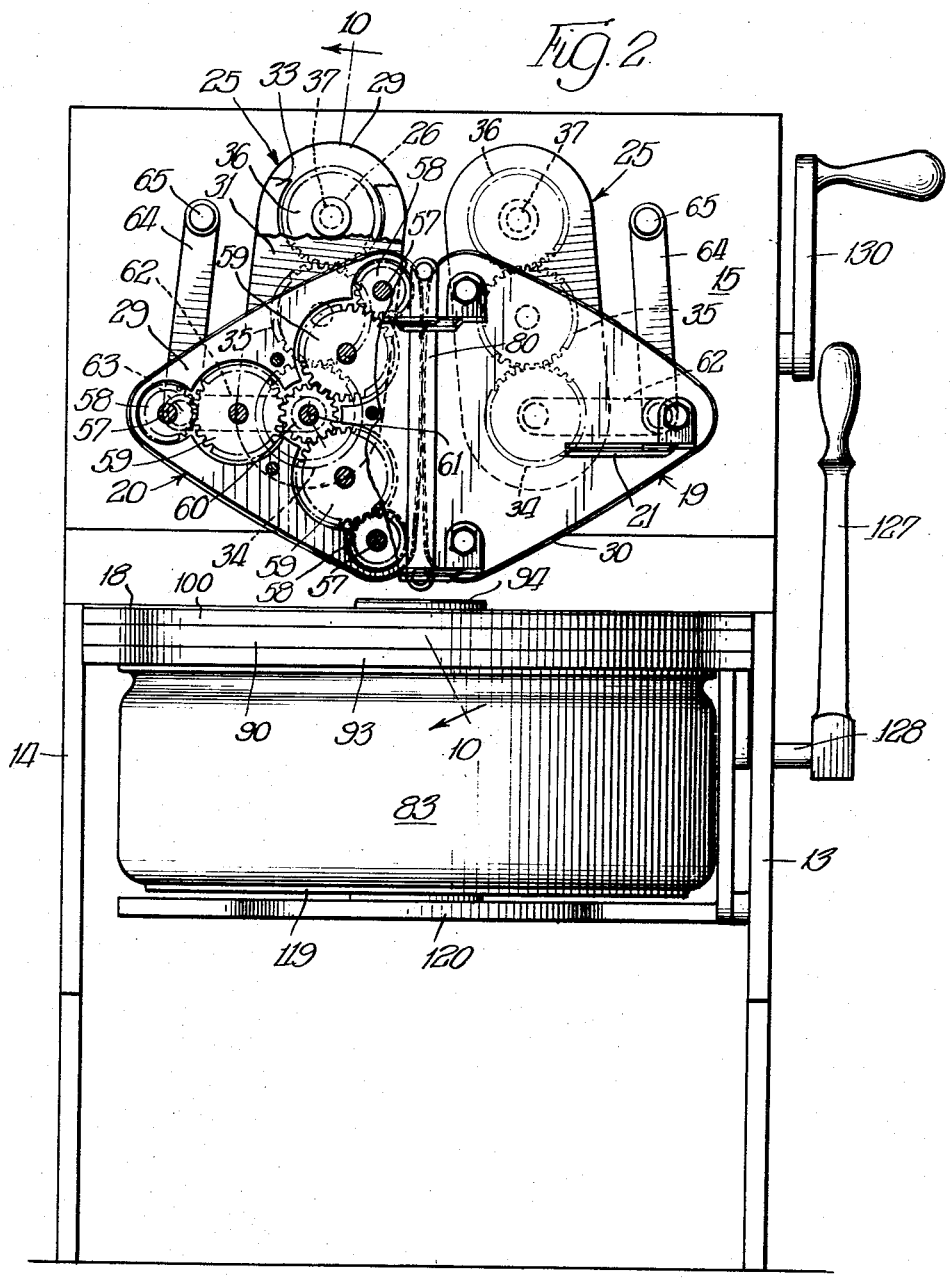

Sept. 28, 1954 L. P. CROSS 2,689,972
SAUSAGE LINKING MACHINE
Filed Nov. 12, 1949 7 Sheets-Sheet 3
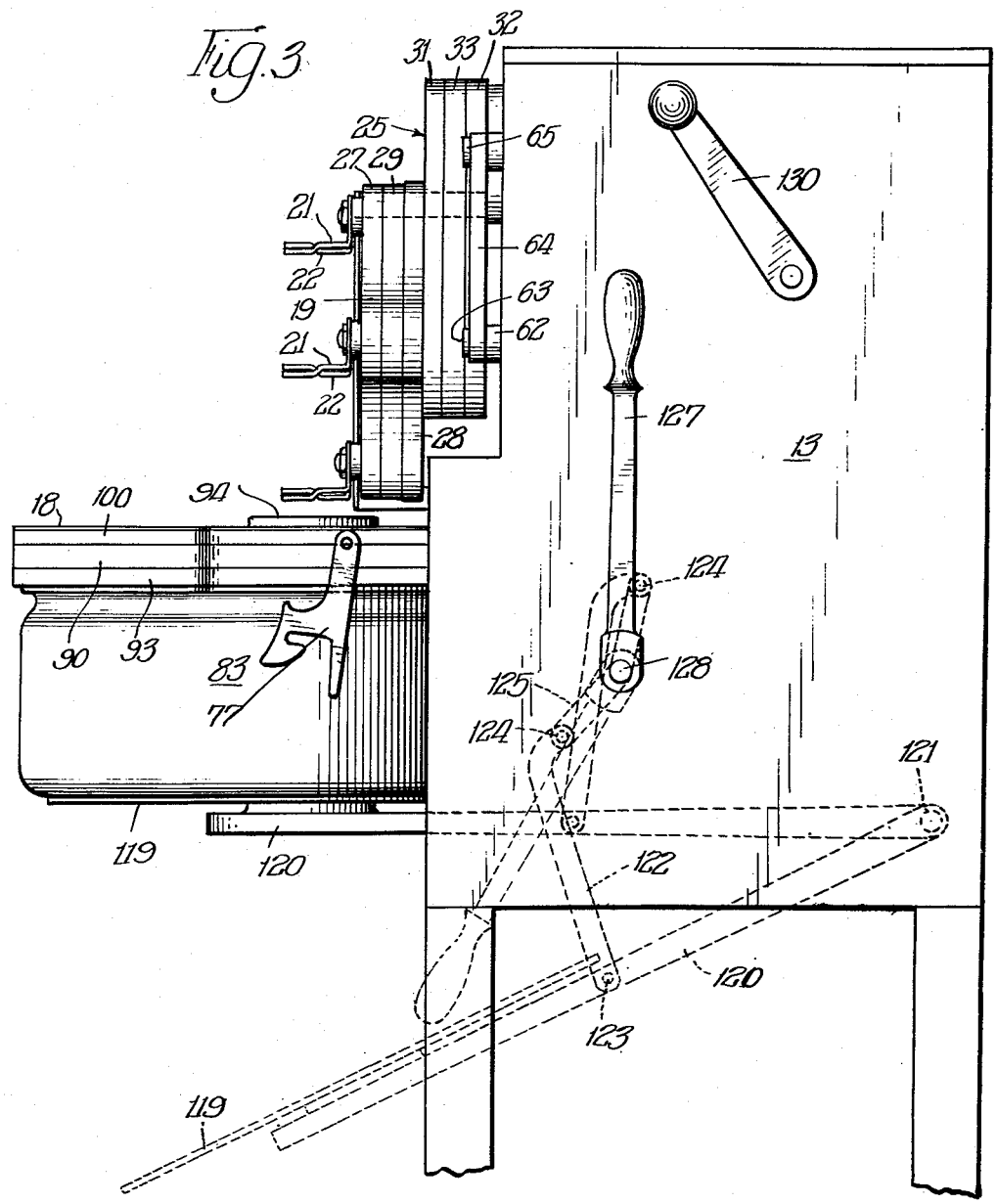
INVENTOR.
Lawrence P Cross,
BY
Cromwell, Greist & Warden

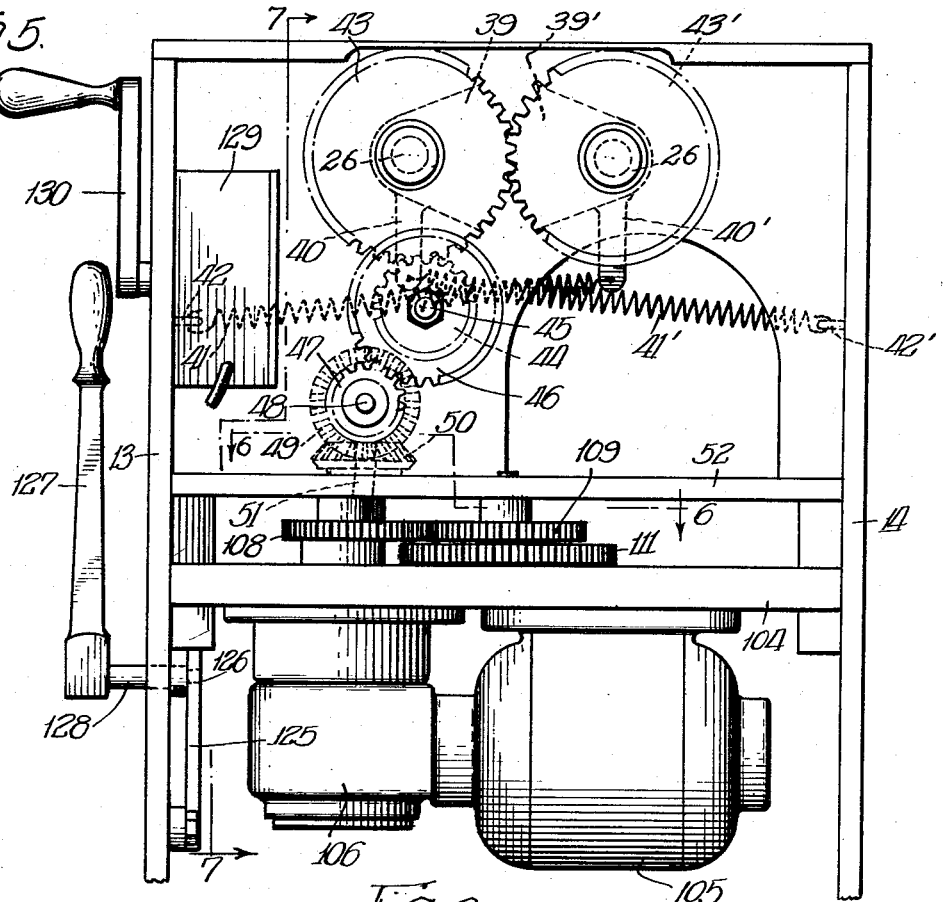
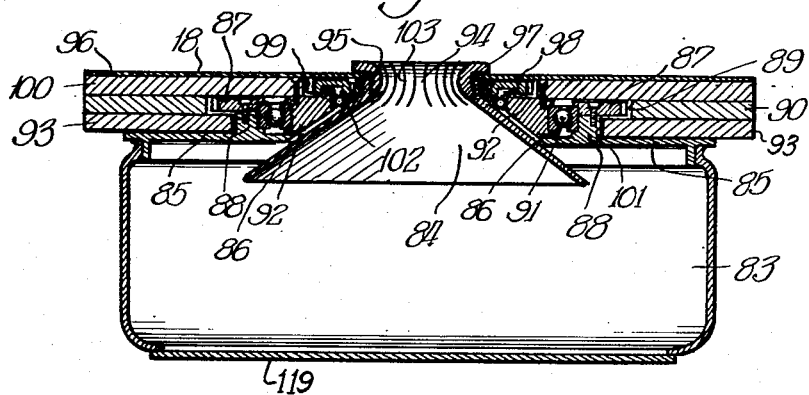

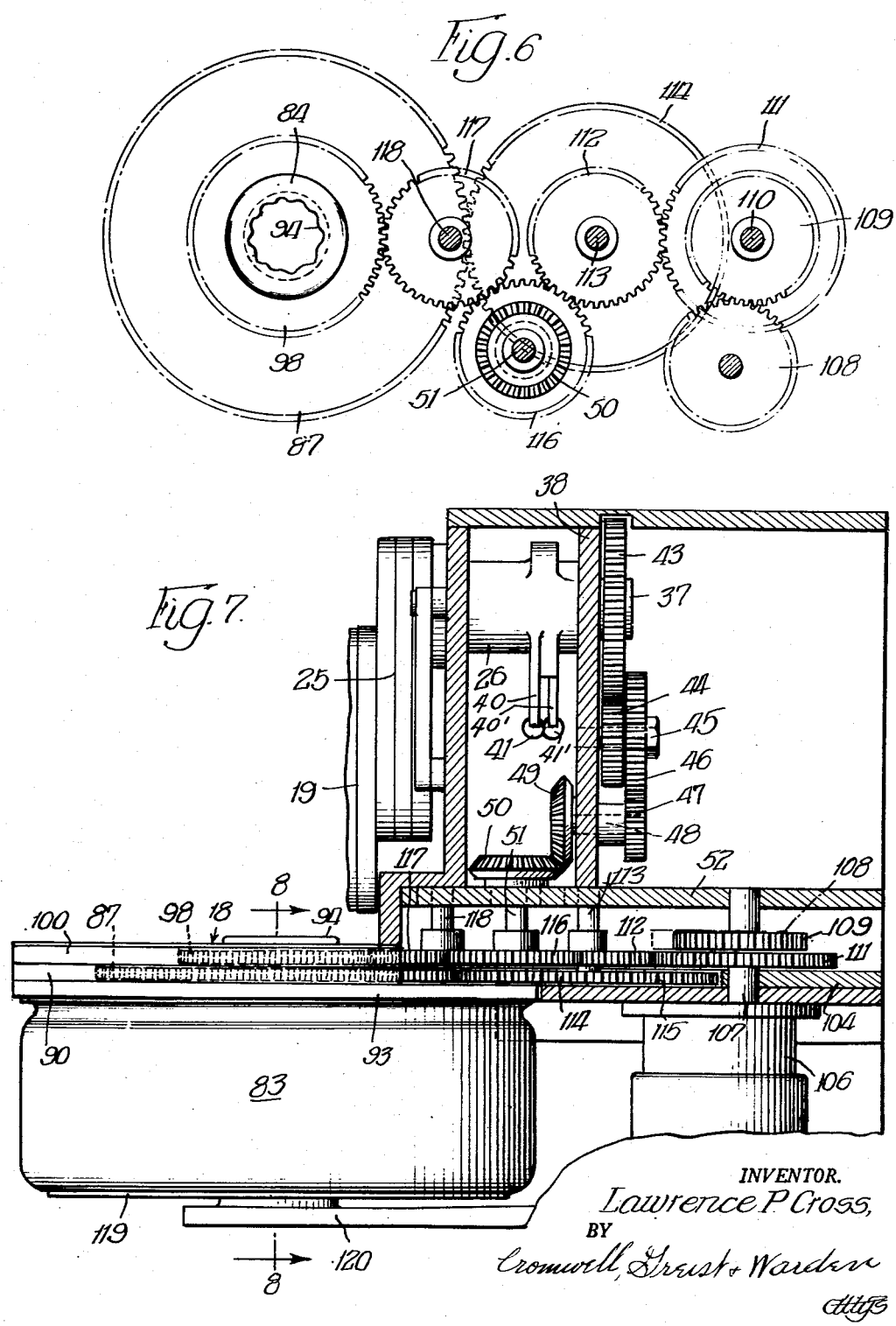

Sept. 28, 1954 L. P. CROSS 2,689,972
SAUSAGE LINKING MACHINE
Filed Nov. 12, 1949 7 Sheets-Sheet 6

INVENTOR.
Lawrence P. Cross,
BY
Cromwell, Greist & Warden
Attys

Sept. 28, 1954     L. P. CROSS     2,689,972
SAUSAGE LINKING MACHINE
Filed Nov. 12, 1949     7 Sheets-Sheet 7
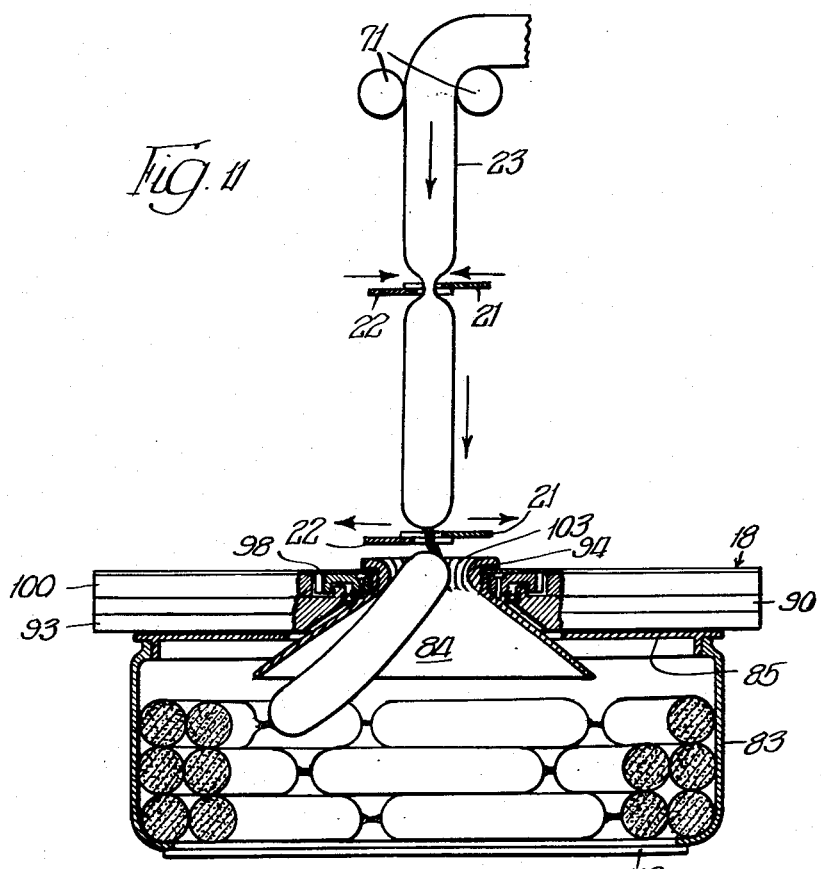
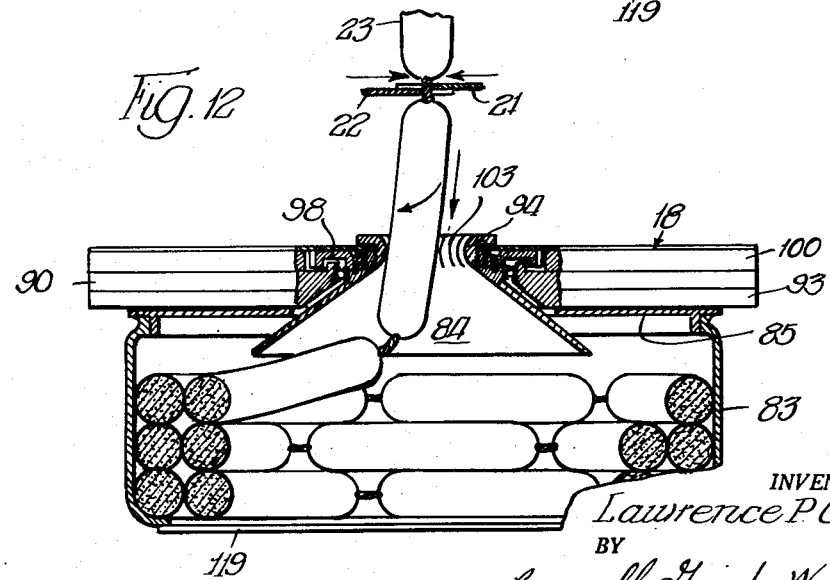
INVENTOR.
Lawrence P Cross,
BY
Cromwell, Greist & Warden
ATTYS.

Patented Sept. 28, 1954

2,689,972

UNITED STATES PATENT OFFICE 2,689,972

SAUSAGE LINKING MACHINE

Lawrence P. Cross, Valparaiso, Ind.

Application November 12, 1949, Serial No. 126,792

27 Claims. (Cl. 17—34)

This invention relates to the manufacture of sausages of the character in which filled or stuffed casings of many feet in length are divided into individual sausages and formed into connected links by twisting the casing at intervals corresponding to the desired length of the sausages.

It is an object of the invention to provide an improved mechanism for the production of link sausages which mechanism will divide a filled casing at predetermined intervals to form individual sausage links of uniform length and automatically rotate successive links in the same direction to provide a twist in the casing in the areas joining the links.

It is another object of the invention to provide a sausage linking machine which will automatically divide a filled sausage casing into sections of predetermined length, which will rotate each successive section to impart a twist in the casing between it and the next succeeding section, and which will collect the twisted sections in coil-like fashion in a container as the twisting is completed.

It is a further object of the invention to provide a sausage linking machine which comprises in combination mechanism for continuously feeding a filled sausage casing, mechanism for constricting the casing at spaced points to divide the same into individual sausage links, mechanism for rotating each successive link to impart a twist in the constricted area between the links, and mechanism for collecting the twisted links into a coiled stack.

It is a more specific object of the invention to provide a sausage linking machine which comprises in combination means for continuously feeding a filled sausage casing, cooperating movable divider members for constricting the casing at spaced points to divide the same into individual sausage links, and rapidly rotating mechanism for imparting a twist in the constricted area between the successive links and for collecting the twisted links into a coiled stack.

It is a still more specific object of the invention to provide a sausage linking machine comprising means for continuously feeding a filled sausage casing, cooperating pairs of movable gripper members operable on opposite sides of the path of travel of the filled casing to engage the casing at intervals and divide the same into a plurality of links of uniform size and a continuously rotating mechanism including a pan and an apertured plate, arranged in spaced relation to the gripper members, for receiving the successive links, whereby to impart a twist at the point where the grippers engage the casing between the successive links, and to stack the twisted links in a coil-like formation in the pan.

It is another object of the invention to provide in a sausage linking machine of the type described a twisting and collecting mechanism, comprising a rotatable centrally apertured cone-shaped plate and a circular pan, encompassing the same, which is rotatable in the same direction but at a different speed, whereby the sausage links are successively twisted and the twisted links are accumulated in coil formation in the circular pan.

It is a further object of the invention to provide in a sausage linking machine a mechanism for dividing a filled sausage casing into a plurality of connected links whereby the casing is constricted at successive spaced points without injury to the casing and without restricting the axial contraction of the casing due to the constricting operation.

It is another object of the invention to provide in a sausage linking machine a mechanism for engaging a filled sausage casing in encompassing relation and at spaced intervals to divide the casing into a series of connected sausage links and for simultaneously therewith rotating each successive link to impart a twist between it and the next succeeding link, without completely confining the respective links in their axial direction of movement and thereby permitting the links to contract lengthwise due to the constricting and twisting operations.

It is a still further object of the invention to provide a sausage linking machine comprising pairs of cooperating divider members which are moved through endless paths on opposite sides of the path of travel of a continuous length of filled sausage casing and which are so arranged that the respective members of each pair are succesively brought toward each other to surround the casing and provide a constricted area of relative small diameter which casing area is adapted to be twisted to divide the casing into a plurality of connected links.

It is another object of the invention to provide in a sausage linking machine pairs of cooperating divider members which are mounted for movement on opposite sides of the path of travel of a continuous length of filled sausage casing and which are so constructed and so mounted that the respective members of each successive pair come together into interfitting engagement and in encompassing relation to the filled casing while at the same time moving axially relative to the path of movement of the casing to constrict the same at spaced points without injury to the casing and to continuously feed the divided casing to a twisting mechanism.

It is still another object of the invention to provide in a sausage linking machine mechanism for constricting a filled casing at predetermined spaced intervals to divide the same into a plurality of links in combination with a twisting mechanism which comprises a rapidly rotating pan having an aperture in the center thereof for receiving the successive sausage links and for imparting a twist between each link and the next succeeding link.

It is another object of the invention to provide in a sausage linking machine mechanism for constricting a filled sausage casing at spaced intervals to divide the same into a plurality of links of predetermined length in combination with a twisting mechanism which comprises a rapidly revolving receptacle having a central aperture aligned with said constricting mechanism for receiving the successive links and a rapidly revolving hollow distributing cone in said receptacle aperture with an outwardly flared end extending into the receptacle whereby a twist is imparted to successive links by centrifugal force and the twisted links are distributed in coiled relation around the periphery of the receptacle.

These and other objects of the invention will be apparent from a consideration of the linking machine which is shown by way of illustration in the accompanying drawings, wherein:

Fig. 1 is a perspective view, with portions broken away, of a sausage linking machine embodying the principles of the invention;

Fig. 2 is a front elevation of the linking machine with the front guard mechanism removed and with portions broken away;

Fig. 3 is a side elevation of the linking machine with the front guard mechanism removed;

Fig. 4 is a perspective view to an enlarged scale of a portion of the machine showing the mechanism for dividing the filled casing;

Fig. 5 is a rear elevation of the machine with the driving mechanism exposed;

Fig. 6 is a section taken generally on the line 6—6 of Fig. 5 and to an enlarged scale showing portions of the driving mechanism;

Fig. 7 is a section taken generally on the line 7—7 of Fig. 5, with portions broken away;

Fig. 8 is a section taken generally on the line 8—8 of Fig. 7;

Figs. 11 and 12 are partial front elevations, with portions in section, showing different stages in the twisting operation.

Figure 9:
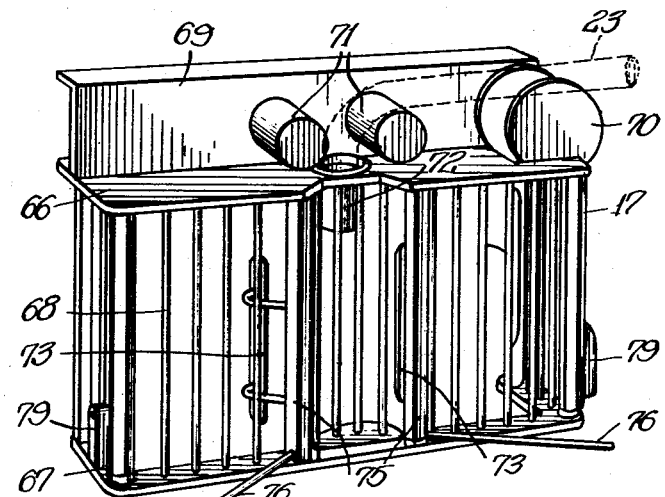
Fig. 9 is a perspective view of the front guard mechanism removed from the machine.

Referring to the drawings, there is shown a mechanism constructed in accordance with the principles of the invention which will divide a continuous length of filled sausage casing into a plurality of links of predetermined length, which will successively rotate each link relative to the remainder of the filled casing to impart a twist between it and the next succeeding link and which will accumulate the twisted links in uniform fashion in a receptacle.

The illustrated mechanism (Figs. 1 to 3) comprises an upright supporting frame or housing 10, a dividing mechanism 11 arranged on one vertical face or wall 15 of the housing 10 and a twisting and accumulating mechanism 12 arranged below the dividing mechanism 11, all driven by a motor 105 and cooperating driving elements supported on or housed within the housing 10.

The supporting frame or housing 10 includes laterally spaced vertically extending side wall or plate members 13 and 14, the upper portions of which are connected by a front wall forming plate 15 extending in a vertical plane between the side plates 13 and 14 to approximately half the depth of the latter and terminating at its lower edge at a relatively narrow ledge forming shelf plate 16 which extends in a generally horizontal plane between the side plates 13 and 14.

The mechanism 11 for dividing the filled sausage casing, is arranged on the front wall plate 15 of the housing 10 and includes a fixed guard mechanism 17 which is removably supported on a semi-circular shelf 18 which shelf 18 extends forwardly in a generally horizontal plane a short distance below the ledge 16 and between the side plates 13 and 14.

Figure 10:
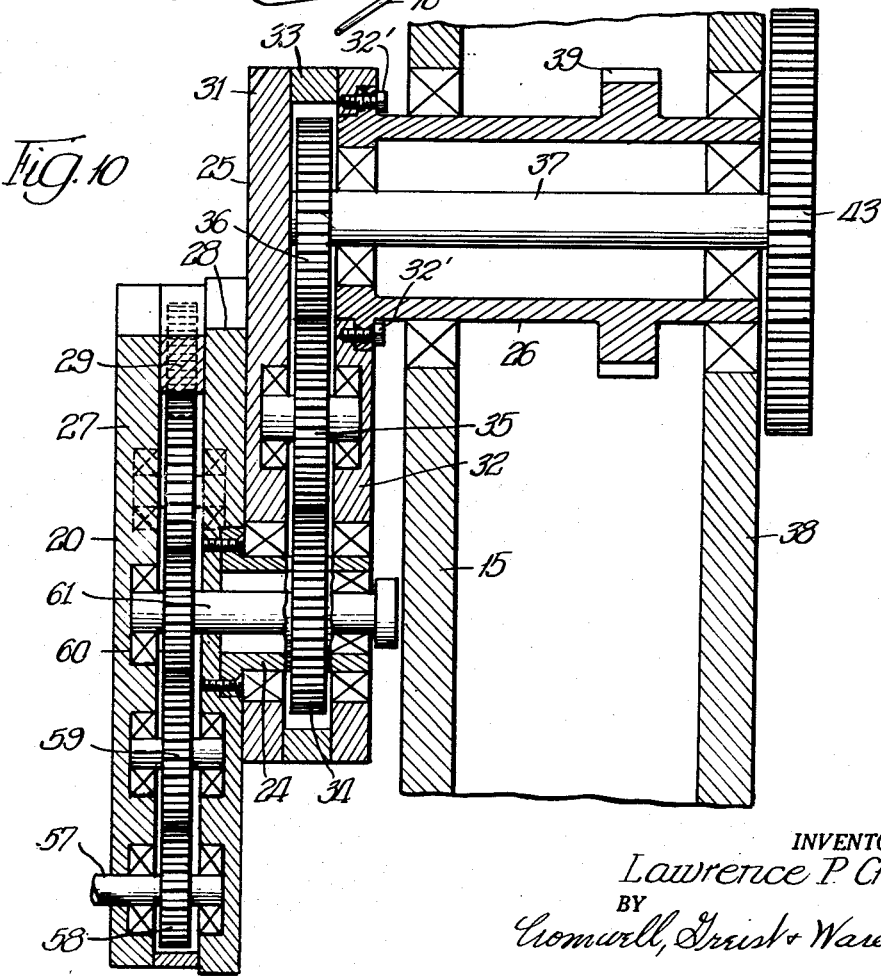
Fig. 10 is a detail section taken generally on the line 10—10 of Fig. 2, to an enlarged scale.

The movable portion of the dividing mechanism 11 is directly supported on the front plate 15 of the housing 10 and includes two rotatably and swingably mounted generally triangular heads 19 and 20, each of which carries adjacent the apexes thereof three fork-like dividing fingers 21 and 22, respectively, which fingers are adapted to cooperate with each other in feeding and dividing the length of filled casing, indicated at 23 (Figs. 11 and 12). The heads 19 and 20 are identical in structure and are supported by means of pivot forming members 24 (Fig. 10) on identical swinging arms 25 which are in turn supported by means of pivot forming members 26 adjacent the top of the front plate 15. The heads 19 and 20 are arranged in opposed relation on opposite sides of the path of movement of the filled casing 23. The dividing fingers 21 and 22 are similar in structure and are arranged to engage in interfitting slidable relation to constrict the casing 23 at spaced intervals.

The structure and operating mechanism of head 20 will be described in detail, it being understood that the head 19 includes corresponding details of structure and operating mechanism. The head 20 consists of a front plate 27, a back plate 28 and a center plate member 29 secured in face-to-face relation. The back plate 28 is slightly larger than the center plate member 29 providing a relatively narrow outwardly bowed or outwardly extending track forming portion 30 which engages with a similar track formation on the opposed head 19 when the heads are rotated. The center plate member 29 is bored or recessed to accommodate controlling gears for the dividing fingers 22 which will be subsequently described.

The head 20 is secured to the pivot member 24 which consists of a flanged hollow shaft journaled in the lower end of supporting arm 25. The flanged end of shaft 24 is bolted or otherwise secured to the back plate 28 of the head 20. The supporting arm 25 comprises front plate 31, back plate 32 and center plate 33 which are secured in face-to-face relation to form an elongate casing. The center plate 33 is bored or recessed to accommodate a train of gears 34, 35 and 36. Gear 34 is secured on the hollow pivot shaft 24 which is journaled in the front and back plates 31 and 32 adjacent the free end of the arm 25. The intermediate idler gear 35 is journaled in the front and back plates 31 and 32 while the gear 36 is mounted on the front end of shaft 37 which extends through the pivot forming sleeve member 26 and is journaled in opposite ends of the latter.

The pivot sleeve 26 (Fig. 10) on which the head supporting arm 25 swings is journaled at opposite ends in the frame front plate 15 and an intermediate vertically extending frame plate 38 which extends between the frame side plates 13 and 14. The sleeve 26 is flanged at its forward end and secured by bolts 32' or otherwise to back plate 32. It is provided intermediate its ends with a gear segment 39 (Figs. 5 and 10) which engages with a corresponding gear segment 39' on the pivot sleeve 26 of supporting arm 25 for the head 19 to insure that the arms 25 will operate in timed relation as the heads 19 and 20 rotate. The gear segments 39 and 39' are provided with depending arms 40 and 40' which are connected to one end of tension springs 41 and 41', the other ends of the springs 41 and 41' being connected at 42 and 42' to the respective side walls 13 and 14 of the housing 10. The springs 41 and 41' urge the free ends of the arms 25 toward each other and insure constant contact between the heads 19 and 20 as they rotate.

The shaft 37 extends beyond the rear end of the pivot sleeve 26 and is provided on its inner end with a gear 43 which meshes with a corresponding gear 43' which forms a part of the drive mechanism for the other head 19. One of the gears 43 meshes with and is driven by a gear 44 mounted on a stub shaft 45 which extends rearwardly of the vertical frame plate 38. A somewhat larger gear 46 is mounted on the end of shaft 45 and engages with a gear 47 which is secured on a horizontal shaft 48. The shaft 48 is journaled in the vertical partition 38 and carries on its other end a bevel gear 49 in driving relation with a bevel gear 50 mounted on a vertically extending driven shaft 51 which is journaled in and projects upwardly from a horizontal frame partition 52. The gears 50, 49, 47, 46, 44 and 43 drive the shafts 37 and through the connected gears 34, 35 and 36 the heads 19 and 20.

The dividing members 21 and 22 on the heads 19 and 20 each comprises an elongate horizontally extending base plate (Fig. 4) which is divided by a generally V-shaped slot 55 into two horizontal projecting finger forming portions 53 and 54. The outer finger portion 54 is offset relative to the inner portion 53 in a horizontal plane a distance approximately equal to the thickness of the material of which the plate is formed. The outer finger portions 54 on the respective dividing members 21 and 22 are offset in opposite directions vertically so that when a divider member 21 on head 19 is brought into cooperative relation with a divider member 22 on head 20 the finger portions 53 and 54 will move into overlapping casing restricting relation. The V-shaped slots in the divider members 21 and 22 terminate at their inner ends in generally rounded or semicircular recesses 55' of a diameter sufficient to accommodate the twisted portion between the respective links after the twisting operation. The finger forming portions are formed with rounded edges where they engage the filled casing to avoid cutting or otherwise damaging the casing during the constricting operation.

The casing dividing members 21 and 22 also each comprises a vertically extending attaching ear or lug 56 (Figs. 2 and 4) which is secured to a shaft 57 extending into the respective head adjacent a corner or apex of the same. The shafts 57 on head 20 (Figs. 2 and 10) are rotatably journaled in the front and back plates 27 and 28 and have secured thereon small gears 58 which are engaged in driving relation with larger idler gears 59 journaled between the face plates 27 and 28. The idler gears 59 engage in driving relation with a relatively small central gear 60 which is mounted on a shaft 61. The shaft 61 is journaled in the front plate 27 and also the pivot sleeve member 24 of the head 20 with its inner end extending through the back plate 28 of the head 20 and the back plate 32 of the arm 25. The inner end of shaft 61 is secured to one end of a generally horizontal control link 62. The other end of the link 62 is pivoted at 63 to the lower end of a generally vertical control link 64 which is pivoted at its upper end at 65 to the frame face plate 15.

The intermediate plate 29 of the head 20 is recessed to receive the gears, shafts and bearings of the divider control mechanisms and the head plates 27, 28 and 29 are secured together in such a manner that the mechanisms within the head are protected from damage by water or the like which may be used to clean the machine while it is in use.

By means of the gear and linkage arrangement described, the divider members 21 and 22 are maintained in the same horizontal position relative to each other, regardless of the rotational position of the heads 19 and 20. As the heads 19 and 20 are rotated about their pivots 24 successive pairs of the divider members 21 and 22 are brought into cooperative relationship on opposite sides of the path of movement of the casing 23 to restrict the casing and divide the same into successive links of predetermined length.

The fixed guard mechanism 17 (Figs. 1 and 9) which cooperates with the divider mechanism comprises top and bottom horizontal plate members 66 and 67 which are connected by a plurality of vertically extending rods 68 spaced along the outer margins of three sides thereof and forming a generally rectangular cage enclosing the divider heads 19 and 20 and the associated mechanisms. An angular plate member 69 extends upwardly of the top plate member 66 and carries at one end on the forward face a forwardly projecting guide roller 70 and intermediate its ends a pair of guide rollers 71.

The guide roller 70 is located adjacent an upper corner of the machine and receives the casing 23 in guiding relation as it is fed to the machine. The guide rollers 71 are located in laterally spaced relation near the vertical center of the machine and guide the casing 23 into a vertically arranged tubular guide member 72 extending downwardly through the top plate member 66.

A pair of vertically extending guide plates or bars 73 are mounted on arms 74 extending inwardly from vertical posts 75 which are pivoted in the upper and lower guard plates 66 and 67 on opposite sides of the path of movement of the casing 23. The posts 75 are provided with rod-like handles 76 at the base adjacent the plate 67 by means of which they may be rotated to move the guide plates 73 toward and from opposite sides of the path of the casing 23. The handle forming rods 76 extend laterally of the machine and are adapted to be engaged by latch members 77 (Fig. 1) which are pivoted at 78 on opposite side edges of the semi-circular shelf 18. The bottom plate member 67 of the guard mechanism 17 rests on the shelf 18 and the latch members 77 engage the rods 76 to hold the entire guard mechanism 17 in operative position on the front of the housing 10. The guard mechanism is provided with pivoted locking elements 79 which engage the tops of the latch members 77 when the latter are in latching position and prevent accidental removal of the guard mechanism.

A fixed guide plate or strip 80 is supported in vertical position on the forward face of the housing 10 (Fig. 4) by forwardly projecting upper and lower pins 81 and 82. The guide strip 80 is spaced forwardly of the dividing heads 19 and 20 and between the supporting flanges 56 of the divider members 21 and 22 when the divider members are in cooperative casing restricting relation.

The filled casing passes through the guide tube 72 which is arranged in aligned relation with the divider members 21 and 22 and is prevented from buckling by guide plates 73 and 80 while it is being constricted by the divider members 21 and 22 and moved downwardly by movement of the heads 19 and 20.

The twisting and accumulating mechanism 12 is arranged below the dividing mechanisms 11 and is supported on the outwardly projecting semi-circular shelf or bracket formation 18. It comprises a rapidly rotating pan or receptacle 83 having peripheral side walls (Fig. 8) and a cone-shaped rotating distributor member 84 which extends into the same. The pan 83 and distributor cone 84 are both supported in rotatable relation beneath the shelf 18 with the top portion of the cone 84 extending through the shelf 18.

The pan 83 is secured at its upper margins to the depending flange of a circular top plate 85 which is provided with a central aperture 86 for accommodating the distributing cone 84. A ring gear 87 is secured to an upwardly projecting portion 88 on the upper surface of the top plate 85 surrounding the aperture 86 and projecting through a central aperture 101 in the bottom plate 93 of the shelf 18. The ring gear 87 is housed in a recess 89 provided in an intermediate plate 90 forming part of the shelf 18. The gear 87 and plate 85 are supported on bearings 91 located in the outer face of a bearing supporting ring 92 secured in depending relation from an upper plate 100 which also forms part of the shelf 18.

The cone distributor member 84 comprises an outwardly flaring bottom portion which extends through the aperture 86 into the pan 83 and the upper restricted throat forming portion 94 which is secured thereon in screw-threaded relation and extends upwardly through a central aperture 95 in the top or cover plate member 96 of the shelf 18, terminating in an outwardly extending flange 97 which overlies the edge of the latter. The cone 84 has secured thereto adjacent the throat member 94 an outwardly projecting ring gear 98 which is received in a recess 99 in the upper plate 100. The cone 84 and the ring gear 98 are supported in rotatable relation by bearing 102 secured on the inner face of the bearing supporting ring 92. The restricted throat formed by member 94 is of greater diameter than the cross sectional diameter of the links (Figs. 8, 11, 12) and is provided with a series of circumferentially spaced vertically extending corrugations 103 for a purpose which will be described.

The intermediate and lower plate members 90 and 93 of shelf 18 extend inwardly of the casing 10 (Fig. 7) and form a lower or bottom horizontal partition member 104 in spaced relation to the horizontal partition member 52 in the casing 10.

The ring gears 87 and 98 are arranged in concentric relation and are rotated by a drive mechanism which also operates the dividing mechanism 11. A driving motor 105 is supported beneath the partition 104 and is drivingly connected with a speed reduction device 106 also secured beneath the partition 104, the latter having its drive shaft 107 extending vertically through the partition members 52 and 104. The drive shaft 107 carries a gear 108 which engages in driving relation with the gear 109 on the vertical shaft 110 which is journaled in the upper and lower plates 52 and 104 and which also carries a larger gear 111. The gear 111 engages in driving relation with a somewhat smaller gear 112 which is mounted on a shaft 113 journaled in the upper and lower plates 52 and 104. The shaft 113 carries a large gear 114 which is received in the recess 115 provided in the plate 104 and which engages in driving relation with the ring gear 87 on the pan 83 to rotate the pan 83. The small gear 112 on the shaft 113 engages in driving relation with a gear 116 which is mounted on the bottom of the shaft 51 depending from the partition member 52. The shaft 51 provides power for operation of the heads 19 and 20 as previously described. The gear 116 engages in driving relation an idler gear 117 which is mounted on the shaft 118 depending from partition member 52. The gear 117 is in driving relation with ring gear 98 which rotates the distributing cone member 84. The speed of rotation of the cone member 84 is less than the speed of rotation of the pan 83 by a predetermined amount which is so related to the length of the twisted sausage links that the latter are deposited in coil fashion around the periphery of the pan 83 (Figs. 11 and 12).

The pan 83 is provided with a bottom member 119 which is rotatably supported on a swingable plate 120. The plate 120 is pivoted to the side wall 13 of the housing 10 at 121 and is adapted to swing downwardly away from the bottom of the pan 83. The movement of the plate 120 is controlled by a linkage mechanism which comprises L-shaped link 122 which is pivoted at one end at 123 intermediate the ends of the supporting plate 120 and at its other end at 124 to the end of a short arm 125 which is secured at its other end at 126 to an operating arm 127 by means of a relatively short connecting shaft 128 which is journaled in the side plate 13 of the housing 10. The pivot points 123, 124 and 126 are so arranged that when the handle 127 is in the upright position (Figs. 1 and 3) the pan bottom 119 is closed against the pan 83 and latched in the closed position due to the location of pivot point 124 relative to pivot points 123 and 126. In order to swing the pan bottom 119 away from the pan 83, the handle 127 is moved forwardly about the pivot point 126 to move pivot point 124 in an arc forwardly and downwardly about the pivot point 126, forcing the plate 120 downwardly about the pivot point 121 by movement of link 122 and arm 125.

The drive motor 105 which provides the operating power for the machine is controlled by a conventional switch arrangement indicated at 129 which is operated by a handle 130 so that the machine may be readily stopped and started by the operator.

In operating the machine, a predetermined length of casing 23 which has been filled with the sausage or other material is fed into the machine over the guide rollers 70, 71, the casing being guided between the pair of rollers 71 and through the guide tube 72 into position for engagement by cooperating pairs of dividers 21 and 22. The filled casing moves downwardly through the passageway formed by the guide plates 73 and 80 between the heads 19 and 20 and is divided into a series of successive sections or links by successive engagement of the pairs of dividers 21 and 22.

The rotation of the heads 19 and 20 is continuous and at a relatively rapid and uniform rate while the dividers 20 and 21 move vertically and horizontally at varying rates of speed. The divider finger forming portions 53 and 54 are maintained by the linkage 62, 64 and the connected control gears in a horizontal position throughout their complete cycle of movement. As the respective dividers 21 and 22 are moved toward each other by rotation of the heads 19 and 20, the finger portions 53 and 54 are moved into overlapping interfitting sliding relation, being engaged with each other from opposite sides of the casing 23 and constricting the casing between them. The finger portions 53, 54 along the slots 55 are rounded on the edges to prevent injury to the casing as they move into encompassing relation to the same.

As the dividers 21 and 22 move toward each other into closely constricting relation with the casing they also move downwardly carrying the casing with them. When the dividers 21, 22 are in approximately the position shown in Figs. 2 and 11, their rate of travel in the vertical direction is very small, permitting the material in the casing to be pushed by the constriction of the casing in both directions lengthwise of the casing. At this point the top dividers 21 and 22 (Figs. 2 and 11) are not quite together, while the bottom pair of dividers which have performed the preceding constricting operation have begun to separate or move apart at the bottom end of the link which is being formed, as illustrated in Fig. 11, particularly, where the direction of movement of the members is indicated by arrows. The top dividers 21 and 22 reach the limit of their movement toward each other when the bottom dividers are opened sufficiently for a stuffed portion of the casing to pass through the latter and before the twisted portion of the casing just released reaches the corrugated or grooved area 103 of the throat of the cone 84. The top dividers remain in closed position (Fig. 12) as they travel downwardly in front of the guide plate 80, the small section of casing which has been constricted being confined to its smallest constricted or cross-sectional area, while the twist is imparted to the area by operation of the twister mechanism 12. The dividers 21 and 22 begin to separate and move apart as they descend to the lowermost position as shown in Fig. 11, thereafter moving apart very rapidly and releasing the lower end of the link which is being formed.

Due to the manner in which the heads 19 and 20 are moved and the curved configuration of the track portion 30 which determines the movement of the dividers 21 and 22, the link being formed or divided from the casing 23 is at no time completely confined between the successive pairs of dividers 21 and 22. The uppermost pair of dividers is not completely closed when the lowermost pair of dividers begin to open. The link is free to contract lengthwise at all times while it is being formed. When the upper pair of dividers close completely and reduce the constricted portion of the casing to its smallest cross-sectional area the lowermost dividers are separated and the lower end of the link is subjected only to the pull of the preceding links. The finished length of the link is less than the distance between the successive pairs of dividers 21 and 22 when they are in vertical alignment and in engagement with the casing because of the reduction in length resulting from the twisting operation.

The twisting of each link begins as the dividers move the casing downwardly and the lower end of the link being formed is advanced into the throat forming member 94 and engaged with the corrugations 103. The preceding links are drawn by centrifugal force due to the rapid rotation of the pan 83 outwardly of the pan 83 and pull the end of the link being formed against the throat 94 to start the twist. At this point in the operation the uppermost dividers 21 and 22 have come together and are moving at a relatively slow rate downwardly. As the link being twisted moves freely through the throat 94 adjacent the axis of rotation of the pan 83, guided by the throat 94, the twisting operation is completed by the rotation of the preceding links due to the centrifugal force resulting from the rotation of the pan 83. The cone 84 tends to distribute the links as the twisting operation proceeds and guides them into coil formation or arrangement around the periphery of the pan 83 as illustrated in Figs. 11 and 12. As the twist is completed by the rotation of the pan and the centrifugal pull on the link, the dividers 21 and 22 complete their downward movement and are rapidly separated by the rotation of the triangular shaped heads 19 and 20.

The successive twisted links are collected in coil formation in the pan 83. When the length of casing being operated on is completely divided by the machine into a plurality of the twisted links the motor is stopped and the operator moves the handle 127 forwardly to lower the bottom 119 of the pan 83 and thereby dropping the coil of links out of the pan and freeing it for removal from the bottom 119.

While specific details of construction have been described for the purpose of illustrating the principles of the invention, it will be understood that various modifications may be resorted to within the scope of the appended claims.

I claim:

1. A sausage linker comprising a supporting frame, guide members mounted on said frame for directing a continuous length of filled sausage casing along a linear path, a pair of arms each swingably mounted at one end on said frame at opposite sides of said path, a pair of divider heads rotatably mounted on the free ends of said arms, said divider heads being generally triangular in shape providing peripherally spaced apexes and having peripheral portions in engagement with each other, means operatively connected with said heads for rotating said heads in opposite directions, and cooperating divider elements rotatably mounted adjacent the apexes of said divider heads, each of said divider elements having a plate-like portion provided with a slot and said plate-like portion being movable upon rotation of said heads into cooperative relation with a corresponding portion of a divider element on the opposite divider head whereby to constrict the sausage casing to a relatively small area defined by said slots.

2. A sausage linker as recited in claim 1 and means connected to said divider elements for controlling the rotation of said divider elements relative to said heads whereby the plate-like portions of cooperating pairs of said divider elements are brought into overlapping engagement upon rotation of said divider heads.

3. A sausage linker as recited in claim 2 wherein the means for controlling the rotation of the divider elements comprises a link swingingly mounted on said frame and interengaging gears which are connected to the divider elements on each divider head to maintain the plate-like portions thereof normal to the path of movement of the sausage casing while permitting the divider elements to be carried toward and from the casing upon rotation of the divider heads.

4. A sausage linker as recited in claim 1 wherein the peripheral portions of said divider heads include tracks which are outwardly bowed whereby to vary the movement of said divider elements toward and from the sausage casing.

5. A sausage linker comprising a supporting frame, guide members on said frame for directing a continuous length of filled sausage casing along a linear path generally parallel to one side of said frame, cooperating divider elements mounted on said frame for movement on opposite sides of said path, supporting heads for said divider elements, arms pivotally mounted for swinging movement on said frame, said supporting heads being rotatably mounted on said arms, means connected with said arms for urging said arms toward each other to hold said heads in peripheral engagement, and drive means operatively connected with said heads for rotating said heads to bring the respective divider elements on the heads into cooperative casing encompassing relation.

6. A sausage linker as recited in claim 5 wherein the drive means for rotating said divider element supporting heads includes interconnected driving members enclosed within said head supporting arms.

7. A sausage linker as recited in claim 5 and control means for said divider elements comprising links pivotally mounted on said frame and interconnected members enclosed within said heads and connected to said links whereby said divider elements are maintained in non-rotating relation relative to said frame while they are moved axially and transversely relative to said casing by rotation of said heads.

8. In a sausage linking machine, a supporting frame, means on said frame for guiding a filled sausage casing along a predetermined path, a continuously moving divider mechanism mounted on said frame along the path of travel of the casing, said divider mechanism engaging the casing at spaced points and forming therein successive sausage links while simultaneously advancing said links, and link receiving mechanism adjacent said divider mechanism for twisting each successive link and accumulating the twisted links in coil formation, said link receiving mechanism comprising a supporting bracket mounted in fixed relation to said supporting frame and extending across the path of movement of said links, said bracket having an aperture aligned with the path of movement of the links and spaced a predetermined distance from the divider mechanism in the direction of the advancing movement of said links, an apertured throat member mounted in the aperture for rotation relative to said supporting bracket, a cylindrical receptacle mounted on said frame adjacent said supporting bracket for rotation relative to said supporting bracket, and drive means connected to said throat member and said receptacle for rapidly and continuously rotating said throat member and said cylindrical receptacle in the same direction to urge the links outwardly of the axis of rotation thereof and to impart a twist between each sausage link and the next succeeding link as the individual links are continuously advanced to said throat member by said continuously moving divider members.

9. In a sausage linking machine, a supporting frame structure, means on said frame for guiding a filled sausage casing along a predetermined path, gripper members mounted on opposite sides of the path of travel of the casing, said gripper members being movable in a closed path and engaging the casing at spaced points to form therein successive sausage links of uniform length while simultaneously advancing the casing, a mechanism mounted on said frame for twisting each successive link while it is advancing and for accumulating the twisted links in coil formation, said mechanism including a centrally apertured plate positioned adjacent said gripper members and extending across said path, an apertured member rotatably mounted in the aperture in said plate, a cone-shaped formation depending from said member, a circular receptacle depending from said apertured plate and supported in encompassing relation to said cone-shaped formation, said receptacle being mounted for rotation relative to said apertured plate, and means operatively connected with said cone-shaped formation and said receptacle for rapidly rotating said cone-shaped formation and said receptacle in the same direction but at different speeds.

10. In a sausage linking machine as recited in claim 9 and said apertured member having relatively shallow, spaced, axially extending grooves.

11. In a sausage linking machine as recited in claim 9 and said receptacle having a bottom plate hingedly mounted thereon for movement away from said receptacle.

12. In a sausage linking machine, a supporting frame structure, means on said frame structure for guiding a filled sausage casing along a predetermined path, gripper members mounted on the frame structure on opposite sides of the path of travel of the casing, means connected to said gripper members to move the same into engagement with the casing at spaced points and form therein successive sausage links, mechanism adjacent said gripper members for twisting each successive link and for accumulating the twisted links in coil formation, said mechanism including a centrally apertured plate supported in fixed relation on the frame structure, an apertured member rotatably mounted in the aperture in said plate, a cone-shaped formation extending from said apertured member, a receptacle rotatably mounted on said plate and in encompassing relation to said cone-shaped formation, and drive means operatively connected with said cone-shaped formation and said receptacle for rapidly rotating said cone-shaped formation and said receptacle in the same direction.

13. In a sausage linking machine, a supporting frame structure, means on said frame structure for guiding a filled sausage casing along a predetermined path, continuously moving members mounted on said frame structure on opposite sides of the path of travel of the casing for engaging the casing at spaced points to form therein successive sausage links, mechanism on said frame structure adjacent said casing engaging members for twisting each successive link and for accumulating the twisted links, said mechanism including a centrally apertured supporting plate extending transversely of said path, a generally cone-shaped member rotatably mounted in the aperture in said supporting plate and having a portion thereof extending from said supporting plate, a receptacle rotatably mounted on said supporting plate and in encompassing relation to the extending portion of said cone-shaped member, and drive means operatively connected with said cone-shaped member and said receptacle for rapidly rotating said cone-shaped member and said receptacle in the same direction.

14. In a sausage linking machine, a supporting frame structure, means on said frame structure for guiding a filled sausage casing along a predetermined path, continuously moving members mounted on said frame structure on opposite sides of the path of travel of the casing for engaging the casing at spaced points to form therein successive sausage links and mechanism on said frame structure adjacent said casing engaging members for twisting each successive link, said mechanism including an apertured supporting plate, an apertured throat member rotatably mounted in the aperture in said supporting plate and having an outwardly flared portion extending therefrom, a receptacle rotatably mounted on said supporting plate and in encompassing relation to said extending portion of said throat member, and drive means operatively connected with said throat member and said receptacle for rapidly rotating said throat member and said receptacle in the same direction.

15. In a sausage linking machine as recited in claim 14 wherein said apertured throat member is provided with a corrugated surface around at least a portion of the aperture therein.

16. In a sausage linking machine as recited in claim 14 wherein a portion of said receptacle is movably mounted relative to the remainder of said receptacle to permit removal of the twisted sausage links.

17. In a sausage linking machine, a supporting frame structure, means on said frame structure for advancing a filled sausage casing along a predetermined path, means mounted on said frame structure on opposite sides of said path for engaging the casing at spaced points to form therein successive sausage links, mechanism on said frame structure adjacent said casing engaging means for twisting each successive link and for accumulating the twisted links, said mechanism including an apertured supporting plate extending transversely of said path, a generally cone-shaped member rotatably mounted in the aperture in said supporting plate and having a portion thereof extending from said supporting plate, said cone-shaped member being provided with a restricted axial opening having relatively shallow circumferentially spaced grooves extending in a generally axial direction, a receptacle rotatably mounted on said supporting plate and in encompassing relation to the extending portion of said cone-shaped member, and drive means operatively connected with said cone-shaped member and said receptacle for rapidly rotating said cone-shaped member and said receptacle in the same direction.

18. In a sausage linking machine, a supporting frame, means on said frame for guiding a filled sausage casing along a predetermined path, cooperating divider members movably mounted on said frame along the path of travel of the casing, means connected to said divider members to move the same into engagement with the casing at spaced points and form therein successive sausage links and simultaneously to advance the links, and mechanism arranged in the path of movement of said links adjacent said divider members for twisting each successive link and accumulating the twisted links in coil formation, said mechanism including a fixed supporting plate mounted to extend transversely of the path of movement of said links, said plate having a relatively small aperture aligned with the divider members and spaced a predetermined distance from said divider members, an apertured throat member rotatably mounted in the aperture in said supporting plate, a cylindrical receptacle mounted on said frame for rotation relative to said supporting plate independently of said throat member, and drive means connected to said throat member and said receptacle member for rapidly rotating said throat member and said cylindrical receptacle in the same direction independently of each other to impart a twist between each sausage link and the next succeeding link as the individual links are delivered to said throat member by movement of said divider members and to arrange said links in coil formation in said receptacle.

19. In a sausage linking machine, a supporting frame structure, means on said frame structure for feeding a filled sausage casing in a predetermined path, means mounted on said frame structure along said path and movable in a closed path for constricting the casing at spaced intervals to divide the same into individual links, a cylindrical receptacle mounted on said supporting structure adjacent said constricting means for receiving the connected links, said receptacle being located relative to said constricting means to receive each link as it is released by said constricting means, means operatively connected to said receptacle for rapidly and continuously rotating the receptacle in a plane generally transverse of the path of movement of the links, and means providing a relatively small unobstructed passageway to guide the links into the receptacle adjacent the axis of rotation thereof, said guide means permitting the links to continuously advance in the direction of their longitudinal axis and said receptacle being rotated with sufficient speed to exert a centrifugal pull on said links as said links advance into said receptacle whereby to impart a twist in the constricted area between each link and the next succeeding link.

20. In a sausage linking machine, a supporting frame structure, means on said frame structure for guiding a filled sausage casing along a predetermined path, cooperating grippers mounted on said frame structure for movement along the path of movement of the casing and arranged to grip the casing at intervals and divide the same into individual links of predetermined length, said grippers simultaneously advancing said formed links, a pan having peripheral side wall formations for receiving the connected links, means mounting said pan on said frame structure adjacent said grippers for rotation about a central axis extending along said path, means forming a restricted opening aligned with said path for guiding successive links during their advancing movement into said pan, and means associated with said pan for rapidly and continuously rotating said pan to force the links outwardly of the axis of rotation and toward the side wall formations whereby to exert a centrifugal pull on said advancing links and impart a twist in the area between each successive link and the following link and to cause said links to arrange themselves in coil formation about the inner periphery of said side wall formations.

21. In a sausage linking machine, a supporting frame structure, means on said frame structure for continuously feeding a filled sausage casing, means comprising cooperating grippers mounted on said supporting structure for movement in a closed path on opposite sides of the casing, means for moving said grippers in said path to grip the casing at intervals and divide the same into individual links of predetermined length while simultaneously advancing the casing, a cylindrical container of large diameter and having a relatively small central opening in the top thereof mounted on said frame structure adjacent said grippers for receiving the connected links from the grippers, said container being spaced from said grippers a sufficient distance to permit each advancing link to enter the opening in the top thereof while the grippers engage between it and the next succeeding link and the opening in the top of said container being sufficiently large to permit each link to advance freely therethrough, and means connected to said container for rapidly and continuously rotating said container to urge the links outwardly of the axis of rotation thereof whereby to rotate each link and impart a twist in the area between it and the next link while said link is advancing into said container.

22. In a sausage linking machine, a supporting frame structure, means on said frame structure for feeding a filled sausage casing in a predetermined path and for constricting the casing at intervals to divide the same into individual links of predetermined length, a container rotatably mounted on said frame structure adjacent said feeding and constricting means and extending across the path of movement of the casing, means forming an unobstructed passageway into said container adjacent the axis of rotation thereof which passageway is larger in diameter than the casing to permit the casing to pass freely therethrough and which passageway is spaced from said feeding and constricting means a distance less than the length of a link for directing successively connected links from the feeding and constricting means into the container, and means operatively connected to said container for rotating said container at a rapid rate of speed sufficient to exert a pull on the links as they move through said passageway and outwardly of the axis of rotation whereby to impart a twist in the constricted area between each link and the next succeeding link while said links move continuously through said passageway into said container.

23. In a machine for forming a length of stuffed casing into a plurality of connected links, a supporting frame structure, means on said frame structure for continuously feeding the stuffed casing in a predetermined path and for engaging the casing at intervals to constrict the casing and divide the same into individual links of predetermined length, a container rotatably mounted on said frame structure adjacent said casing feeding and constricting means for receiving the connected links therefrom, means operatively connected with said container for rotating said container about its own axis and in a plane extending generally transverse the path of the links at a high rate of speed, and means forming an unobstructed passageway between said feeding and constricting means and said container for guiding the links into the container along the axis of rotation thereof, said guiding means permitting continuous advancing movement of said links in their axial direction and cooperating with said container to rotate each link about its own axis and impart a twist between each link and the next succeeding link as each link advances into said container.

24. In a linking machine, a supporting frame structure, means mounted on said frame structure for advancing a stuffed casing in a predetermined path and for constricting the casing at spaced intervals to divide the same into individual links, a cylindrical receptacle rotatably mounted on said supporting structure in position to receive therein each link as it is released by said advancing and constricting means, means forming a small unobstructed link guiding passageway rotatably mounted adjacent the axis of rotation of said cylindrical receptacle, said passageway forming means having a radially extending portion projecting into said cylindrical receptacle, and means associated with said cylindrical receptacle for rotating said cylindrical receptacle at a sufficiently high rate of speed to exert a centrifugal pull on said links outwardly of the receptacle as said links are guided through said passageway in an axial and radial direction into said cylindrical receptacle whereby to impart a twist in the constricted area between each link and the next succeeding link.

25. In a machine for forming a length of stuffed casing into a plurality of connected links, a supporting frame structure, means on said frame structure for feeding a stuffed casing in a predetermined path and for constricting the casing at intervals to divide the same into individual links of predetermined length, a container rotatably mounted on said frame structure adjacent said feeding and constricting means and extending across the path of movement of the divided casing, a throat member forming a small unobstructed passageway into said container adjacent the axis of rotation thereof which passageway is larger in diameter than the casing whereby to permit the casing to pass without interruption therethrough into the container, said throat member being spaced from said feeding and constricting means a distance less than the length of a link for receiving successively the connected links from the feeding and constricting means, said throat member having a corrugated internal surface, and means operatively connected to said container for rotating said container at a high rate of speed whereby the links are urged outwardly of the axis of rotation and axially rotated to impart a twist in the constricted area between each link and the next succeeding link while said links are moving freely through said throat member into said container.

26. In a machine for forming a length of stuffed casing into a plurality of connected links, a supporting frame structure, means on said frame structure for continuously feeding the stuffed casing in a predetermined path and for engaging the casing at intervals to constrict the casing and divide the same into individual links of predetermined length, a cylindrical container of large diameter and having a throat formation of relatively small diameter at one end thereof, said throat formation having its internal surface corrugated with the corrugations extending in an axial direction, said container being rotatably mounted on said frame structure with said one end adjacent said casing feeding and construction means for receiving the connected links through said throat formation, and means operatively connected with said container for rotating said container at a high rate of speed about its own axis and in a plane extending transversely of the path of the links, said container throat formation permitting continuous advancing movement of said links in their axial direction and the rapid rotation of said container causing each link to rotate about its own axis and impart a twist between it and the next succeeding link as each link advances into said container.

27. In a machine for linking a filled casing, a supporting frame structure, means on said structure for continuously feeding a filled casing in a predetermined path and for constricting the casing at intervals without interrupting its movement, whereby to preliminarily divide the filled casing into individual links of predetermined length, a drum rotatably mounted on said structure adjacent said feeding and constricting means and extending across the path of movement of the casing, said drum being provided at the axis of rotation thereof with a free and unobstructed passageway which is substantially larger in diameter than the casing, whereby to permit the casing to pass without interruption therethrough into the drum, and which passageway is spaced from said feeding and constricting means a distance less than the length of one link, and means operatively connected to said drum for continuously rotating the same at a rate of speed sufficient to form the previously twisted links into a coil which will line the inside of the drum and will move as a unit with the same under the action thereon of centrifugal force, whereby the link entering the drum through said passageway will be twisted relative to the feeding and constricting means by reason of its connection with the preceding coiled links in the drum.

References Cited in the file of this patent

UNITED STATES PATENTS

| Number | Name | Date |
| --- | --- | --- |
| 873,877 | Louden, Sr. | Dec. 17, 1907 |
| 1,361,094 | Pappazoglidis et al. | Dec. 7, 1920 |
| 1,545,586 | Kruse | July 14, 1925 |
| 1,554,382 | Stallman | Sept. 22, 1925 |

FOREIGN PATENTS

| Number | Country | Date |
| --- | --- | --- |
| 20,096 | Great Britain | Sept. 3, 1912 |